US009162621B2

(12) United States Patent
Sakakibara et al.

(10) Patent No.: US 9,162,621 B2
(45) Date of Patent: Oct. 20, 2015

(54) PARKING SUPPORT APPARATUS

(71) Applicant: AISIN SEIKI KABUSHIKI KAISHA, Kariya-shi, Aichi-ken (JP)

(72) Inventors: Haruki Sakakibara, Nagoya (JP); Makoto Hirata, Ichinomiya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/502,083

(22) Filed: Sep. 30, 2014

(65) Prior Publication Data

US 2015/0098624 A1    Apr. 9, 2015

(30) Foreign Application Priority Data

Oct. 4, 2013    (JP) .................................. 2013-209674

(51) Int. Cl.
    *B60R 1/00*    (2006.01)
    *G06K 9/00*    (2006.01)
    *G06T 11/60*    (2006.01)

(52) U.S. Cl.
    CPC .............. *B60R 1/00* (2013.01); *G06K 9/00812* (2013.01); *G06T 11/60* (2013.01); *B60R 2300/305* (2013.01); *B60R 2300/806* (2013.01)

(58) Field of Classification Search
    CPC ................... G06T 3/4038; G06T 2207/30252; G06T 11/60; B60Q 9/005; B60R 1/00; B60R 2300/602; G06K 9/00791; G06K 9/209; G06K 9/00812
    See application file for complete search history.

(56) References Cited

U.S. PATENT DOCUMENTS

| | | | | |
|---|---|---|---|---|
| 5,434,927 A * | 7/1995 | Brady et al. | ................... | 382/104 |
| 6,654,670 B2 * | 11/2003 | Kakinami et al. | ................ | 701/1 |
| 6,919,822 B2 | 7/2005 | Tanaka et al. | | |
| 7,043,346 B2 * | 5/2006 | Kubota et al. | ................... | 701/28 |
| 7,069,128 B2 * | 6/2006 | Iwama | ........................... | 701/36 |
| 7,117,073 B2 * | 10/2006 | Endo et al. | ...................... | 701/28 |
| 7,755,511 B2 * | 7/2010 | Yamamoto et al. | ......... | 340/932.2 |
| 8,140,209 B2 * | 3/2012 | Adachi et al. | .................... | 701/23 |
| 8,243,994 B2 * | 8/2012 | Suzuki et al. | .................. | 382/104 |
| 8,275,173 B2 * | 9/2012 | Wu et al. | ........................ | 382/104 |
| 8,319,618 B2 * | 11/2012 | Gomi et al. | .................... | 340/435 |
| 2003/0156045 A1* | 8/2003 | Tanaka et al. | .............. | 340/932.2 |
| 2007/0097209 A1* | 5/2007 | Kubota | ......................... | 348/118 |
| 2014/0188580 A1* | 7/2014 | Nerayoff et al. | ................. | 705/13 |

FOREIGN PATENT DOCUMENTS

JP    2003-212073 A    7/2003

* cited by examiner

*Primary Examiner* — Jingge Wu
(74) *Attorney, Agent, or Firm* — Sughrue Mion, PLLC

(57) ABSTRACT

A parking support apparatus includes: a captured image acquisition unit acquiring a captured image from an image capturing unit which images surrounding scenery of a vehicle; a target destination section setting unit setting a target destination section which is located around the vehicle and at which the vehicle arrives, based on the image; a vertex coordinates calculation unit calculating coordinates of a vertex of the section; an intersection coordinates calculation unit calculating coordinates of the vehicle at an intersection between a parallel line parallel to the vehicle in a width direction and frame lines configuring the section in a top view when the vertex is closer to a center side of the vehicle than the parallel line; and a destination frame superposition unit superposing a destination frame onto the image by linearly connecting positions in the image corresponding to the vertex on a side separated farther from the vehicle than the parallel line among the vertexes, and the intersection.

4 Claims, 5 Drawing Sheets

PARKING SUPPORT APPARATUS

CROSS REFERENCE TO RELATED APPLICATIONS

This application is based on and claims priority under 35 U.S.C. §119 to Japanese Patent Application 2013-209674, filed on Oct. 4, 2013, the entire contents of which are incorporated herein by reference.

TECHNICAL FIELD

This disclosure relates to a parking support apparatus which distinctly indicates a target destination section at which a vehicle arrives.

BACKGROUND DISCUSSION

In the related art, a parking support apparatus has been utilized to support a parking operation for a driver parking a vehicle. Such a type of technology is disclosed in JP-A-2003-212073 (Reference 1).

Reference 1, a parking support apparatus calculates a target parking position at the time of restarting a parking support and displays the target parking position at the time of restarting thereof on a screen of display means as a default of a display position for a target parking frame at the time of a reset when the parking support stops after the parking support starts and the parking support restarts, based on the target parking position set before restarting the parking support.

However, as is in the technology disclosed in Reference 1, when the target parking frame is displayed as it is, there is a case of being rendered in a distorted shape influenced by an inflection point of an image capturing unit or deformation of a display image. In order to prevent a shape of frame lines configuring the target parking frame from being distorted, it can be considered to adopt four vertexes of the target parking frame to render in a straight line. However, when a host vehicle approaches the target parking frame, the vertexes deviate from an imaging range of the image capturing unit. Thus, the target parking frame cannot be rendered on the display image.

SUMMARY

Thus, a need exists for a parking support apparatus which is not suspectable to the drawback mentioned above.

An aspect of this disclosure is directed to a parking support apparatus including a captured image acquisition unit that acquires a captured image from an image capturing unit which images surrounding scenery of a vehicle; a target destination section setting unit that sets a target destination section which is located around the vehicle and at which the vehicle arrives, based on the captured image; a vertex coordinates calculation unit that calculates coordinates of a vertex of the target destination section; an intersection coordinates calculation unit that calculates coordinates of an intersection between a parallel line which is parallel to the vehicle in a width direction and frame lines which configure the target destination section in a top view of the vehicle when the vertex of the target destination section is closer to a center side of the vehicle than the parallel line; and a destination frame superposition unit that superposes a destination frame onto the captured image by linearly connecting positions in the captured image respectively corresponding to the vertex on a side separated farther from the vehicle than the parallel line among the vertexes of the target destination section, and the intersection calculated by the intersection coordinates calculation unit.

With this configuration, the destination frame can be rendered in a straight line on the captured image to be displayed on a display unit so that it is possible to render a destination frame which is comfortable for a driver to see regardless of distortion of the image capturing unit or the display image. Therefore, the driver can grasp a location of the target destination section by glancing at the destination frame. Even when the vehicle approaches the target destination section, it is possible to set the vertexes which are datum points for the destination frame in response to the intersection between the frame lines configuring the target destination section, and the parallel line so that the destination frame can be renewed based on the set intersection. Therefore, it is possible to allow the driver to grasp the location of the target destination section without being confused until the vehicle arrives at the target destination section.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A parking support apparatus according to the embodiment disclosed here is configured to be able to appropriately display a destination frame defining a target destination section at which a vehicle arrives, regardless of a positional relationship between the vehicle and the target parking section. Hereinafter, a parking support apparatus 100 of the present embodiment will be described in detail.

Figure 1:
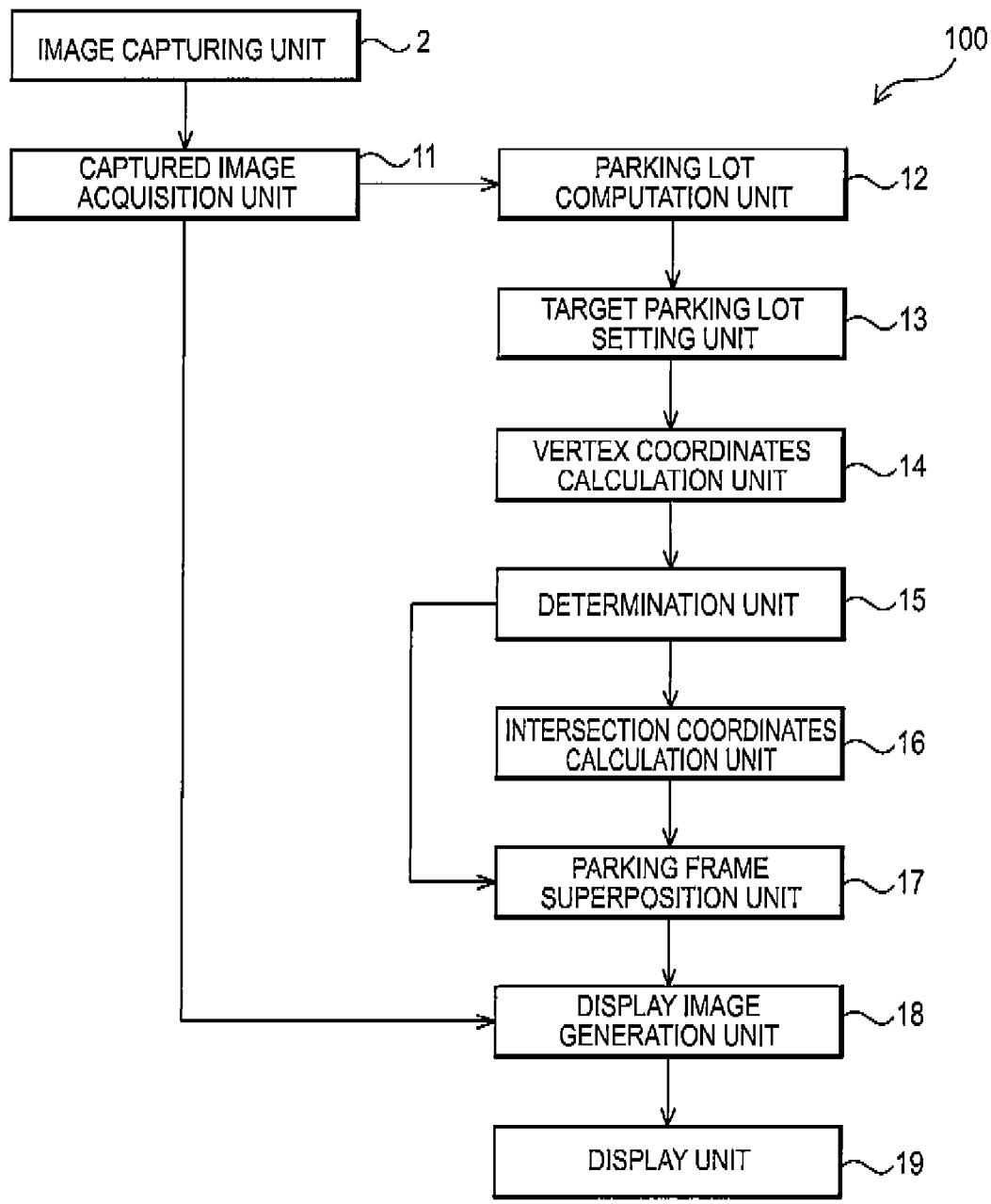
FIG. 1 is a block diagram schematically illustrating a configuration of a parking support apparatus.

FIG. 1 illustrates a schematic block diagram of a configuration of the parking support apparatus 100 according to the present embodiment. As illustrated in FIG. 1, the parking support apparatus 100 is configured to include each of functional units such as a captured image acquisition unit 11, a parking section computation unit 12, a target parking section setting unit 13, a vertex coordinates calculation unit 14, a determination unit 15, an intersection coordinates calculation unit 16, a parking frame superposition unit 17, a display image generation unit 18, and a display unit 19. A CPU is a core member for each of the functional units, and the aforementioned functional units are established in hardware or software, or in both thereof so as to perform various types of processing in respect of properly displaying the destination frame defining the target destination section at which a vehicle 1 arrives. In the embodiment, the parking support apparatus 100 is provided in the vehicle 1.

Figure 2:
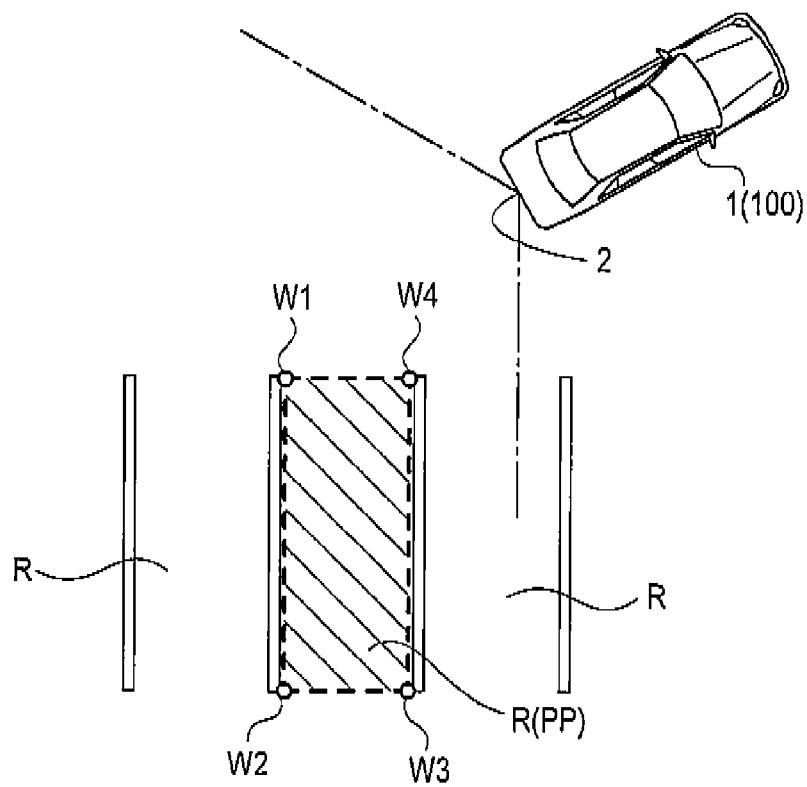
FIG. 2 is a diagram illustrating an example of an imaging range and a destination frame.

The captured image acquisition unit 11 acquires a captured image from an image capturing unit which images surrounding scenery of the vehicle 1. In the present embodiment, for convenience of understanding, descriptions will be given assuming that the surroundings of the vehicle 1 is the rear side of the vehicle 1. For this reason, the captured image is acquired by an image capturing unit 2 provided in a central portion of a rear end portion of the vehicle 1 in a width direction. The image capturing unit 2 in the present embodiment is equipped with an image capturing device such as a charge couple device (CCD) or a CMOS image sensor (CIS), and is configured with a digital camera which outputs captured information as moving image information. As illustrated in FIG. 2, such an image capturing unit 2 is arranged in the vicinity of the license plate provided in an outer side rear portion of the vehicle 1 or in the vicinity of the emblem provided in another outer side rear portion of the vehicle 1, having a slightly depressed angle toward the rear side of the vehicle 1. The image capturing unit 2 is configured to include a wide angle lens (not illustrated). Accordingly, throughout a wide range in the rear side of the vehicle 1, surrounding scenery of the vehicle 1 can be imaged. The image capturing unit 2 has a function to output the moving image as the captured image in real time. The captured image acquisition unit 11 acquires such a captured image.

Here, the captured image acquisition unit 11 performs reflected image processing with the acquired captured image so as to cause an object present on the left side when seeing the rear side from the vehicle 1 to be present on the right side in the captured image. The reason for this is to help a driver of the vehicle 1 to sensibly and easily understand whether an object included in the captured image is on the left side or the right side of the vehicle 1 when rearview scenery of the vehicle 1 is displayed on a monitor (the display unit 19). The captured image acquisition unit 11 transmits such a captured image to the parking section computation unit 12 described below.

The parking section computation unit 12 computes a parking section R included in the captured image acquired by the captured image acquisition unit 11. The parking section R included in the captured image has a range at least wider than the vehicle width of the vehicle 1 on the rear side of the vehicle 1 included in the captured image, and has a space longer than the vehicle length of the vehicle 1. Such a parking section R can be realized by causing the parking section computation unit 12 to perform image recognition with respect to the captured image. Since such image recognition is well known, thereby omitting the description thereof. The parking section computation unit 12 computes the range at least wider than the vehicle width of the vehicle 1 on the rear side of the vehicle 1 included in the captured image by image processing, and the space longer than the vehicle length of the vehicle 1, as the parking section R. The result detected by the parking section computation unit 12 is transmitted to the target parking section setting unit 13 described below.

The target parking section setting unit 13 as an embodiment of a destination section setting unit sets the target destination section which is located around the vehicle 1 and at which the vehicle 1 arrives, based on the captured image. As described above, the parking section computation unit 12 computes the parking section R included in the captured image. As the parking section computation unit 12 performs the computation, all the parking sections R included in the captured image are detected. In the present embodiment, descriptions will be given assuming that the target destination section is a target parking section PP which is located on the rear side of the vehicle 1 and at which the vehicle 1 is parked. Therefore, the target parking section setting unit 13 sets the parking section R at which the vehicle 1 is parked and which is located on the rear side of the vehicle 1 as the target parking section PP, among the parking section R computed by the aforementioned the parking section computation unit 12. Such setting of the target parking section PP may be automatically performed and may be manually performed by a driver pressing a touch panel which is also used as a monitor. The target parking section PP set by the target parking section setting unit 13 is transmitted to the vertex coordinates calculation unit 14 described below.

The vertex coordinates calculation unit 14 calculates coordinates of vertexes W1 to W4 of the target parking section PP in a top view of the vehicle 1. Here, as illustrated in FIG. 2, the target parking section PP is defined to have a rectangular shape in accordance with the shape of the vehicle 1. The vertexes W1 to W4 are four vertexes included in the target parking section PP which is indicated to have such a rectangular shape. The vertex coordinates calculation unit 14 calculates the coordinates of the vertexes W1 to W4 in a top view of the vehicle 1. Here, as the coordinate system to be adopted in the parking support apparatus 100, a coordinate system on the basis of the vehicle 1 (hereinafter, referred to as "world coordinate system") is adopted so as to easily calculate positional relationships with respect to the vehicle 1, the target parking section PP, and the like. Therefore, in the present embodiment, the expression "a top view of the vehicle 1" denotes a top view of the vehicle 1 according to the world coordinate system unless otherwise mentioned. Therefore, the vertex coordinates calculation unit 14 calculates the coordinates of the vertexes W1 to W4 in such a world coordinate system. The result calculated by the vertex coordinates calculation unit 14 is transmitted to the determination unit 15 described below.

The determination unit 15 determines whether or not the vertexes W1 to W4 of the target parking section PP is closer to a center side of the vehicle than a parallel line which is parallel to the vehicle 1 in a width direction 1M, in a top view of the vehicle 1. The present embodiment exemplifies a case where the vehicle 1 is parked at the target parking section PP which is located on the rear side of the vehicle 1. Therefore, the determination unit 15 determines whether or not the vertexes W1 to W4 of the target parking section PP is closer to the center side of the vehicle than a parallel line which is parallel to the vehicle 1 in a width direction 1M, in a top view of the vehicle 1. As described above, the coordinates in the world coordinate system is calculated for the vertexes W1 to W4 of a parking frame W. Meanwhile, in such a world coordinate system, since the coordinates are determined based on the vehicle 1, the coordinates of four corner portions (the front left end portion, the front right end portion, the rear left end portion, and the rear right end portion) of the vehicle 1 in the world coordinate system are known. In the present embodiment, the determination unit 15 determines whether or not at least any one of the vertexes W1 to W4 is closer to the center side of the vehicle than the parallel line which is parallel to the vehicle 1 in the width direction 1M. Therefore, the determination unit 15 adopts the coordinates of the vertexes W1 to W4 in the world coordinate system and the coordinates of four corner portions of the vehicle 1, thereby determining whether or not at least any one of the vertexes W1 to W4 is closer to the center side of the vehicle 1 than the parallel line which is parallel to the vehicle 1 in the width direction 1M when the vehicle 1 is vertically seen from above. The result determined by the determination unit 15 is transmitted to the intersection coordinates calculation unit 16 and the parking frame superposition unit 17 described below.

Figure 3:
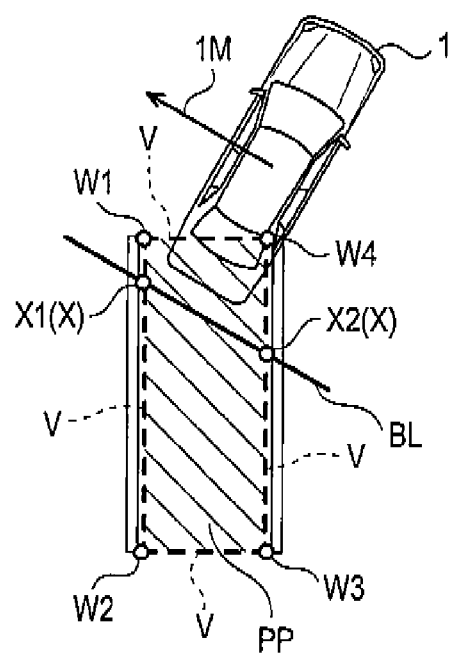
FIG. 3 is a diagram illustrating an example when a parallel line overlaps a frame line.

As illustrated in FIG. 3, when at least any one of the vertexes W1 to W4 of the target parking section PP is closer to the center side of the vehicle than the parallel line which is parallel to the vehicle 1 in the width direction 1M, in a top view of the vehicle 1, the intersection coordinates calculation unit 16 calculates coordinates of an intersection X between a back line BL which is an embodiment of the parallel line, and frame lines V configuring the target parking section PP in a top view of the vehicle 1. Whether or not at least any one of the vertexes W1 to W4 of the target parking section PP is closer to the center side of the vehicle than the parallel line which is parallel to the vehicle 1 in the width direction 1M, in a top view of the vehicle 1 is specified by the determined result of the determination unit 15. The back line BL which is parallel to the vehicle 1 in the width direction 1M is a virtual line that is provided in the rear side of the vehicle 1 and is parallel to the vehicle 1 in the width direction 1M, as illustrated in FIG. 3. In the present embodiment, the back line BL is set to be separated from a rear end portion which is an end portion of the vehicle 1 being oriented in a proceeding direction of the vehicle 1. In other words, in a top view of the vehicle 1 as illustrated in FIG. 3, the vehicle 1 and the back line BL are set to have a predetermined gap therebetween.

The frame lines V configuring the target parking section PP are four sides configuring the rectangular target parking section PP. More specifically, the frame lines V are straight lines respectively connecting the vertex W1 and the vertex W2, the vertex W2 and the vertex W3, the vertex W3 and the vertex W4, and the vertex W4 and the vertex W1. When the determination unit 15 determines that at least any one of the vertexes W1 to W4 of the target parking section PP is closer to the center side of the vehicle than the back line BL in a top view of the vehicle 1, the intersection coordinates calculation unit 16 calculates the coordinates of the intersection X between the back line BL and the frame lines V in the world coordinate system. In the example of FIG. 3, the intersection coordinates calculation unit 16 calculates the coordinates of an intersection X1 between the frame line V connecting the vertex W1 and the vertex W2, and the back line BL in the world coordinate system. The intersection coordinates calculation unit 16 also calculates the coordinates of an intersection X2 between the frame line V connecting the vertex W3 and the vertex W4, and the back line BL in the world coordinate system. The result calculated by the intersection coordinates calculation unit 16 is transmitted to the parking frame superposition unit 17 described below.

The parking frame superposition unit 17 as an embodiment of a destination frame superposition unit superposes the parking frame W which is the destination frame onto the captured image by linearly connecting positions in the captured image respectively corresponding to the vertex on the side separated farther from the vehicle 1 than the back line BL which is the parallel lines among the vertexes W1 to W4 of the target parking section PP, and the intersection X calculated by the intersection coordinates calculation unit 16. The vertex on the side separated farther from the vehicle 1 than the back line BL is a vertex on the farther rear side than the back line BL when seen from the vehicle 1. In the example of FIG. 3, the vertexes W2 and W3 correspond thereto. The intersection X calculated by the intersection coordinates calculation unit 16 is a result calculated by the intersection coordinates calculation unit 16, and the intersections X1 and X2 correspond thereto in the example of FIG. 3. The parking frame superposition unit 17 calculates positions in the captured image respectively correspond to the coordinates in the world coordinate system of the vertexes W2 and W3 and the intersections X1 and X2, and then, the parking frame superposition unit 17 causes the parking frame W obtained by linearly connecting each of the vertex W2 and the intersection X1, the vertex W2 and the vertex W3, and the vertex W3 and the intersection X2 to superpose the captured image.

Meanwhile, when the determination unit 15 determines that none of the vertexes W1 to W4 of the target parking section PP is closer to the center side of the vehicle than the back line BL in a top view of the vehicle 1, the parking frame superposition unit 17 causes the parking frame W obtained by linearly connecting each of the vertex W1 and the vertex W2, the vertex W2 and the vertex W3, the vertex W3 and the vertex W4, and the vertex W4 and the vertex W1 to superpose the captured image.

In the present embodiment, the captured image captured by the image capturing unit 2 is transmitted to the display image generation unit 18 from the captured image acquisition unit 11. The parking frame superposition unit 17 causes the parking frame W to superpose the captured image which has been transmitted to the display image generation unit 18.

The display image generation unit 18 generates a display image which is to be displayed on the display unit 19, based on the captured image acquired by the captured image acquisition unit 11, and the parking frame W caused to superpose the captured image by the parking frame superposition unit 17. The display image generation unit 18 uses the captured image acquired by the captured image acquisition unit 11 as the display image, as it is. In the present embodiment, as the display image, the display image generation unit 18 generates the captured image which is acquired by the captured image acquisition unit 11, is captured by the image capturing unit 2, and is related to rearview scenery of the vehicle 1. The display image generation unit 18 may cause the captured image display related to the scenery captured by the image capturing unit 2 to be displayed as it is, and may cause the same to be displayed after trimming a predetermined portion to match the image size for the display unit 19.

The parking frame W is caused to superpose the captured image by the parking frame superposition unit 17 in the display image generation unit 18, as described above. Such a display image generated by the display image generation unit 18 is transmitted to the display unit 19 described below.

The display unit 19 is a monitor provided in the vehicle 1 to display rearview scenery of the vehicle 1 and the aforementioned parking frame W distinctly indicating the target parking section PP of the vehicle 1. When a driver sees the parking frame W displayed on the display unit 19, the driver can intuitively recognize a positional relationship between the target parking section PP set by the parking support apparatus 100, and the vehicle 1.

Figure 4A:
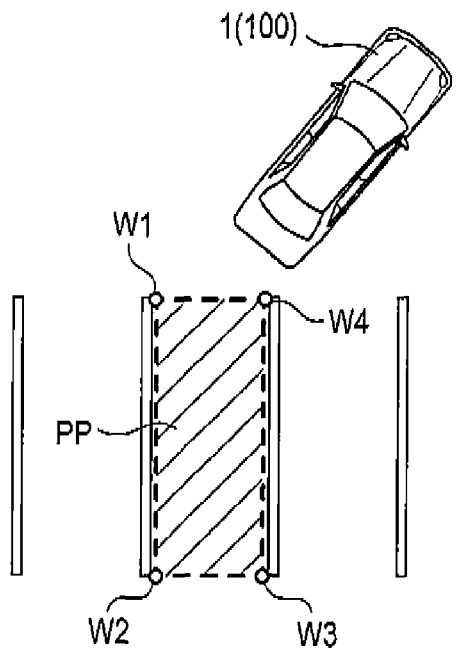
FIG. 4A is a diagram illustrating an example of a display image when the parallel line overlaps no frame line (a diagram of a vehicle in a top view)
Figure 4B:
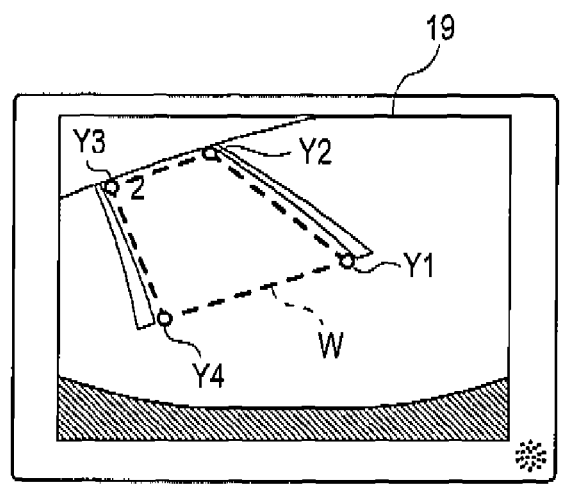
FIG. 4B is a diagram illustrating an example of a display image when the parallel line overlaps no frame line (a display image of a display unit of the vehicle)

Subsequently, descriptions will be given regarding the parking frame W which is caused to superpose the captured image by the parking frame superposition unit 17. FIG. 4A is a diagram illustrating the vehicle 1 in a top view, and FIG. 4B illustrates the display image of the vehicle 1 on the display unit 19. As illustrated in FIG. 4A, the target parking section PP at which the vehicle 1 is parked is set at the rear side of the vehicle 1. The vertex coordinates calculation unit 14 calculates the coordinates of the vertexes W1 to W4 of the target parking section PP. In the present example, none of the vertexes W1 to W4 of the target parking section PP is closer to the center side of the vehicle than the back line BL. In such a case, as illustrated in FIG. 4B, the parking frame superposition unit 17 linearly connects each of positions Y1 to Y4 in the captured image corresponding to the vertexes W1 to W4, thereby displaying the parking frame W.

Figure 5A:
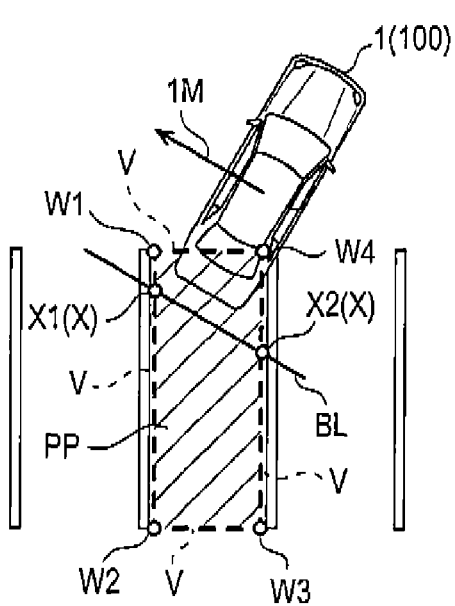
FIG. 5A is a diagram illustrating an example of a display image when the parallel line overlaps the frame lines (a diagram of the vehicle in a top view)
Figure 5B:
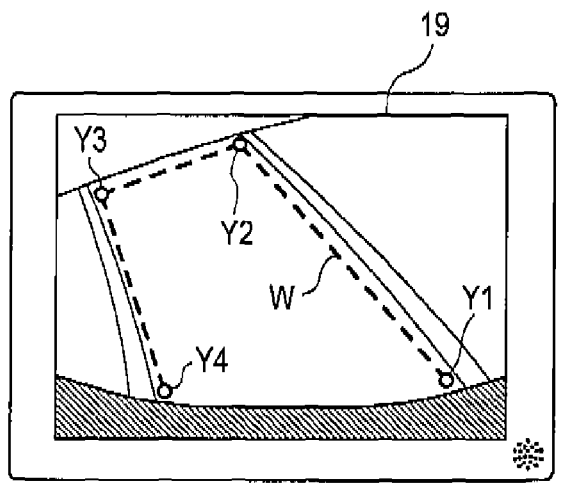
FIG. 5B is a diagram illustrating an example of a display image when the parallel line overlaps the frame lines (a display image of the display unit of the vehicle)

Meanwhile, as illustrated in 5A, when at least one of the coordinates of the vertexes W1 to W4 of the target parking section PP set at the rear side of the vehicle 1 is closer to the center side of the vehicle than the back line BL, the intersection coordinates calculation unit 16 calculates the coordinates of the intersections X1 and X2 between the back line BL and the frame lines V configuring the target parking section PP. As illustrated in FIG. 5B, the parking frame superposition unit 17 causes the parking frame W to superpose thereof based on a vertex farther to the rear side than the back line BL among the vertexes W1 to W4, and the intersections X1 and X2. More specifically, the parking frame W is displayed by linearly connecting each of the positions Y1 to Y4 in the captured image corresponding to the vertexes W2 and W3 and the intersections X1 and X2. In FIG. 5B, the side of the parking frame W on the vehicle 1 side is not shown because it is at a location overlapped by the vehicle 1 as illustrated in FIG. 5A.

Figure 6:
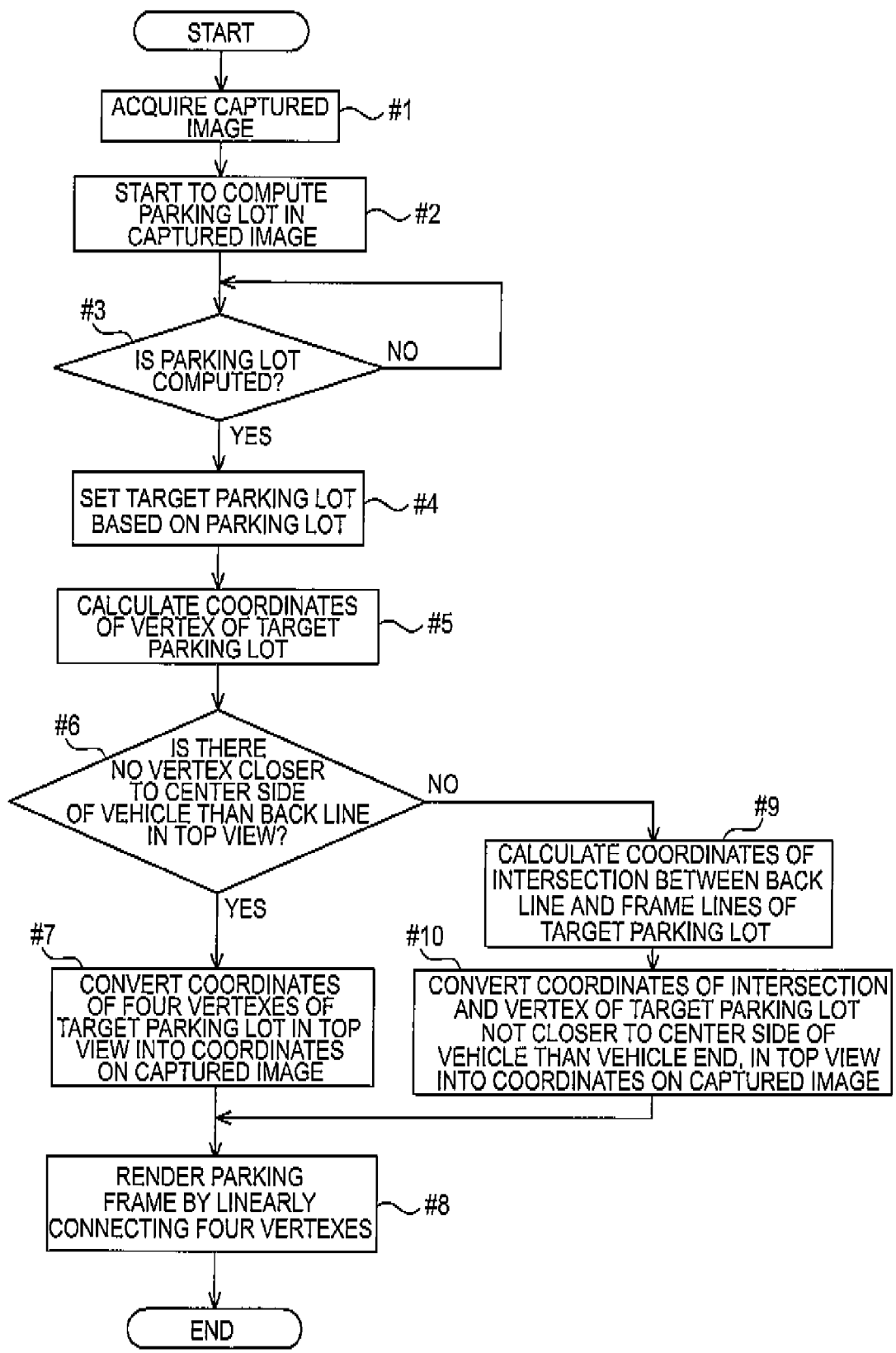
FIG. 6 is a flow chart illustrating processing performed by the parking support apparatus.

Subsequently, processing performed by the parking support apparatus 100 will be described with reference to the flow chart in FIG. 6. Initially, the captured image acquisition unit 11 acquires a captured image from the image capturing unit in which the image capturing unit 2 captures surrounding scenery of the vehicle 1 (Step #1). Based on the captured image, the parking section computation unit 12 starts to compute the parking section R in the captured image (Step #2). When the parking section R is computed (Step #3: Yes), the target parking section setting unit 13 sets the target parking section PP out of the parking section R (Step #4).

The vertex coordinates calculation unit 14 calculates the coordinates of the vertexes W1 to W4 of the set target parking section PP (Step #5). In a top view, when none of the vertexes W1 to W4 is closer to the center side of the vehicle than the back line BL set at the rear side of the vehicle 1 to be parallel to the vehicle 1 in the width direction 1M (Step #6: Yes), the coordinates of four vertexes W1 to W4 of the target parking section PP in a top view are converted into the coordinates on the captured image (Step #7). Points are psectionted at positions on the captured image related to the coordinates obtained by such conversion, and the psectionted points are connected with straight lines, thereby rendering the parking frame W (Step #8).

In step #6, in a top view, when at least one of the vertexes W1 to W4 is closer to the center side of the vehicle than the back line BL set at the rear side of the vehicle 1 to be parallel to the vehicle 1 in the width direction 1M (Step #6: No), the intersection coordinates calculation unit 16 calculates the coordinates of the intersection X between the back line BL on an upper surface of the vehicle 1 and the frame lines V configuring the target parking section PP (Step #9). The coordinates of the intersection X and the coordinates of the vertex of the target parking section PP not closer to the center side of the vehicle than the back line BL, in a top view of the vehicle 1, are converted into the coordinates on the captured image (Step #10). Points are psectionted at positions on the captured image related to the coordinates obtained by such conversion, and the psectionted points are connected with straight lines, thereby rendering the parking frame W (Step #8).

Other Embodiments

Figure 7:
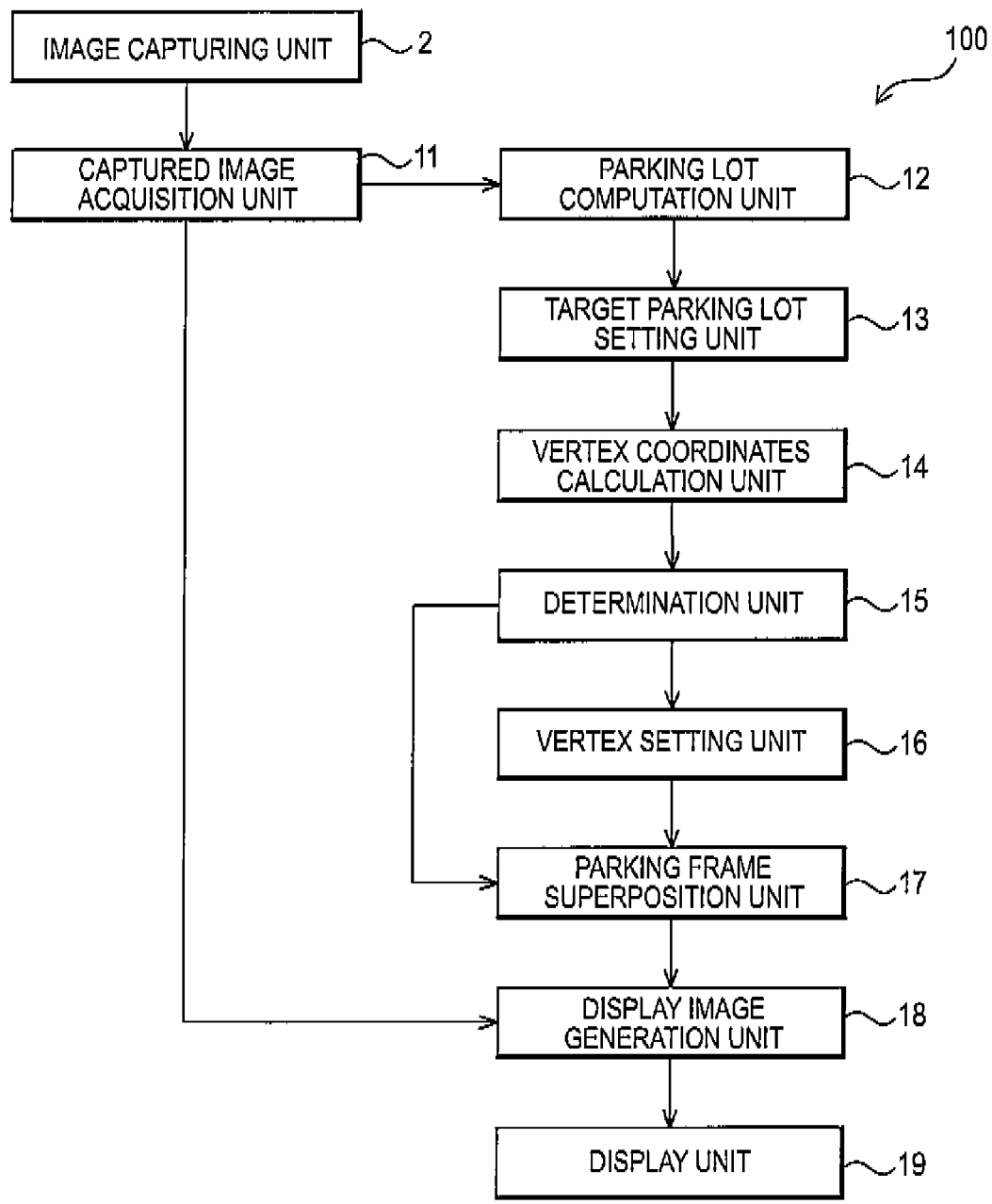
FIG. 7 is a block diagram schematically illustrating a configuration of the parking support apparatus in another case.

In the embodiment described above, the parking support apparatus 100 is configured to include each of the functional units such as the captured image acquisition unit 11, the parking section computation unit 12, the target parking section setting unit 13, the vertex coordinates calculation unit 14, the determination unit 15, the intersection coordinates calculation unit 16, the parking frame superposition unit 17, the display image generation unit 18, and the display unit 19. As illustrated in FIG. 7, in other words, it is also possible to express the parking support apparatus 100 to be configured to include each of the functional units such as the captured image acquisition unit 11, the parking section computation unit 12, the target parking section setting unit 13, the vertex coordinates calculation unit 14, the determination unit 15, a vertex setting unit 26, the parking frame superposition unit 17, the display image generation unit 18, and the display unit 19.

In such a case as well, the parking support apparatus 100 has the same configurations for the captured image acquisition unit 11, the parking section computation unit 12, the target parking section setting unit 13, the vertex coordinates calculation unit 14, and the determination unit 15 as those in the embodiment described above, thereby omitting the descriptions thereof.

When the vertexes W1 to W4 of the target parking section PP is closer to the center side of the vehicle than the back line BL which is the parallel line parallel to the vehicle 1 in the width direction 1M, in a top view of the vehicle 1, the vertex setting unit 26 sets a new vertex X (corresponding to the aforementioned "intersection X") in a region in which no portion of the vehicle 1 is present, based on a frame line V which is included in the captured image and overlaps no portion of the vehicle 1, among the frame lines V configuring the target parking section PP. Whether or not the vertexes W1 to W4 of the target parking section PP is closer to the center side of the vehicle than the back line BL which is parallel to the vehicle 1 in the width direction 1M, in a top view of the vehicle 1 is determined by the determination unit 15. A portion of the vehicle 1 included in the captured image is a bumper of the vehicle 1 included in the captured image, for example. Therefore, the state of overlapping no portion of the vehicle 1 denotes a state where the frame lines V do not intersecting the bumper and are not hidden from the captured image. The region having no portion of the vehicle 1 present is a region where the bumper of the vehicle 1 is not indicated, and a region where rearview scenery of the vehicle 1 captured by the image capturing unit 2 is shown.

The vertex setting unit 26 sets the new vertex X (the intersections X1 and X2 in the example of FIGS. 4A and 4B) in the region where rearview scenery of the vehicle 1 in such a captured image is shown, based on the frame line V in the region. The coordinates of the new vertex X set by the vertex setting unit 26 in a top view is transmitted to the parking frame superposition unit 17.

The parking frame superposition unit 17 as an example of the destination frame superposition unit superposes the parking frame W (the destination frame) onto the captured image based on the vertex overlapping no portion of the vehicle 1, and the new vertex X set by the vertex setting unit 26, among the vertexes W1 to W4 of the target parking section PP. The vertex overlapping no portion of the vehicle 1 is a vertex in the region where rearview scenery of the vehicle 1 shown in the captured image. The coordinates indicating the new vertex X is transmitted from the vertex setting unit 26. Therefore, the parking frame superposition unit 17 superposes the parking frame W onto the captured image by adopting the two types of vertexes.

In the embodiment described above, the back line BL is set to be separated from the rear end portion of the vehicle 1.

However, the application scope of the embodiment disclosed here is not limited thereto. It is possible to set the back line BL to come into contact with the rear end portion of the vehicle 1.

In the embodiment described above, the captured image acquisition unit 11 acquires the captured image from the image capturing unit 11 capturing rearview scenery of the vehicle 1. Moreover, the target destination section is the target parking section PP which is located on the rear side of the vehicle 1 and at which the vehicle 1 is parked. However, the application scope of the embodiment disclosed here is not limited thereto. It is possible to configure a central portion of a front end portion of the vehicle 1 in the width direction to include the image capturing unit which captures frontward scenery of the vehicle 1, and to cause the captured image acquisition unit 11 to acquire the captured image from the image capturing unit which captures frontward scenery of the vehicle 1. Then, after the vehicle 1 proceeds forward from a predetermined position, the target destination section can be a reverse start section from which reversing starts toward the target parking section PP which is located on the rear side of the vehicle 1 and at which the vehicle 1 is parked. In such a case as well, the destination section setting unit sets the target destination section so as to cause the parking support apparatus 100 to perform the aforementioned processing, thereby making it possible to display the destination frame on the captured image. In such a configuration, similarly to the embodiment described above, it is possible to allow a driver to grasp the location of the reverse start section without being confused until the vehicle 1 arrives at the reverse start section.

The embodiment disclosed here can be utilized in a parking support apparatus which specifies a target destination section at which a vehicle arrives.

An aspect of this disclosure is directed to a parking support apparatus including a captured image acquisition unit that acquires a captured image from an image capturing unit which images surrounding scenery of a vehicle; a target destination section setting unit that sets a target destination section which is located around the vehicle and at which the vehicle arrives, based on the captured image; a vertex coordinates calculation unit that calculates coordinates of a vertex of the target destination section; an intersection coordinates calculation unit that calculates coordinates of an intersection between a parallel line which is parallel to the vehicle in a width direction and frame lines which configure the target destination section in a top view of the vehicle when the vertex of the target destination section is closer to a center side of the vehicle than the parallel line; and a destination frame superposition unit that superposes a destination frame onto the captured image by linearly connecting positions in the captured image respectively corresponding to the vertex on a side separated farther from the vehicle than the parallel line among the vertexes of the target destination section, and the intersection calculated by the intersection coordinates calculation unit.

With this configuration, the destination frame can be rendered in a straight line on the captured image to be displayed on a display unit so that it is possible to render a destination frame which is comfortable for a driver to see regardless of distortion of the image capturing unit or the display image. Therefore, the driver can grasp a location of the target destination section by glancing at the destination frame. Even when the vehicle approaches the target destination section, it is possible to set the vertexes which are datum points for the destination frame in response to the intersection between the frame lines configuring the target destination section, and the parallel line so that the destination frame can be renewed based on the set intersection. Therefore, it is possible to allow the driver to grasp the location of the target destination section without being confused until the vehicle arrives at the target destination section.

It is preferable that the target destination section is a target parking section which is located on the rear side of the vehicle and at which the vehicle is parked, or a reverse start section from which the vehicle starts to reverse toward the target parking section which is located on the rear side of the vehicle and at which the vehicle is parked after proceeding forward from a predetermined position.

With this configuration, it is possible to allow the driver to be distinctly notified of the location without being confused until the vehicle arrives at the target parking section or a reverse start position.

It is preferable that the parallel line is set to be separated from an end portion of the vehicle being oriented in a proceeding direction of the vehicle.

With this configuration, there is no need to render the destination frame to include a boundary portion between the vehicle in the captured image and scenery around the vehicle, thereby being allowed only to render the destination frame within a range from surroundings of the vehicle to the parallel line. Therefore, even when a shape of the end portion of the vehicle has no straight line, it is easy to calculate the intersection between the parallel line and the frame lines of the target destination section, and thus, the calculation can be minimized.

Another aspect of this disclosure is directed to a parking support apparatus including a captured image acquisition unit that acquires a captured image from an image capturing unit which images surrounding scenery of a vehicle; a target destination section setting unit that sets a target destination section which is located around the vehicle and at which the vehicle arrives, based on the captured image; a vertex coordinates calculation unit that calculates coordinates of a vertex of the target destination section; a vertex setting unit that sets a new vertex in a region in which no portion of the vehicle is present when the vertex of the target destination section is closer to a center side of the vehicle than the parallel line which is parallel to the vehicle in a width direction, based on frame lines which are included in the captured image and overlap no portion of the vehicle, among the frame lines configuring the target destination section; and a destination frame superposition unit that superposes a destination frame onto the captured image based on the vertex overlapping no portion of the vehicle and the new vertex set by the vertex setting unit, among the vertexes of the target destination section.

With this configuration, similarly to the aforementioned effect, it is possible to render the destination frame which is comfortable for the driver to see regardless of distortion of the image capturing unit or the display image. Therefore, the driver can grasp the location of the target destination section by glancing at the destination frame. It is possible to allow the driver to grasp the location of the target destination section without being confused until the vehicle arrives at the target destination section.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking support apparatus comprising:
a captured image acquisition unit that acquires a captured image from an image capturing unit which images surrounding scenery of a vehicle;
a target destination section setting unit that sets a target destination section which is located around the vehicle and at which the vehicle arrives, based on the captured image;
a vertex coordinates calculation unit that calculates coordinates of a vertex of the target destination section;
an intersection coordinates calculation unit that calculates coordinates of the vehicle at an intersection between a parallel line which is parallel to the vehicle in a width direction and frame lines which configures the target destination section in a top view when the vertex of the target destination section is closer to a center side of the vehicle than the parallel line; and
a destination frame superposition unit that superposes a destination frame onto the captured image by linearly connecting positions in the captured image respectively corresponding to the vertex on a side separated farther from the vehicle than the parallel line among the vertexes of the target destination section, and the intersection calculated by the intersection coordinates calculation unit.

2. The parking support apparatus according to claim 1, wherein the target destination section is a target parking section which is located on the rear side of the vehicle and at which the vehicle is parked, or a reverse start section from which the vehicle starts to reverse toward the target parking section which is located on the rear side of the vehicle and at which the vehicle is parked after proceeding forward from a predetermined position.

3. The parking support apparatus according to claim 1, wherein the parallel line is set to be separated from an end portion of the vehicle being oriented in a proceeding direction of the vehicle.

4. A parking support apparatus comprising:
a captured image acquisition unit that acquires a captured image from an image capturing unit which images surrounding scenery of a vehicle;
a target destination section setting unit that sets a target destination section which is located around the vehicle and at which the vehicle arrives, based on the captured image;
a vertex coordinates calculation unit that calculates coordinates of a vertex of the target destination section;
a vertex setting unit that sets a new vertex in a region in which no portion of the vehicle is present when the vertex of the target destination section is closer to a center side of the vehicle than the parallel line which is parallel to the vehicle in a width direction, based on frame lines which are included in the captured image and overlap no portion of the vehicle, among the frame lines configuring the target destination section; and
a destination frame superposition unit that superposes a destination frame onto the captured image based on the vertex overlapping no portion of the vehicle and the new vertex set by the vertex setting unit, among the vertexes of the target destination section.

* * * * *